United States Patent [19]
Hattori et al.

[11] Patent Number: 5,699,172
[45] Date of Patent: Dec. 16, 1997

[54] IMAGE FORMING APPARATUS AND METHOD HAVING A TONER AND INK SAVING FEATURE

[75] Inventors: Toshiyuki Hattori; Noriyoshi Chiba, both of Nagano, Japan

[73] Assignee: Seiko Epson Corporation, Tokyo, Japan

[21] Appl. No.: 493,555

[22] Filed: Jun. 22, 1995

[30] Foreign Application Priority Data

Jun. 23, 1994 [JP] Japan .................. 6-141970

[51] Int. Cl.⁶ .................. G06F 15/00; H04N 1/40
[52] U.S. Cl. .................. 358/459; 382/268; 382/266; 358/450; 358/401; 395/101
[58] Field of Search .................. 395/112, 113, 395/134, 117, 103, 109; 358/459, 401, 406, 465, 471, 450; 382/198, 199, 252, 254, 256, 268

[56] References Cited

U.S. PATENT DOCUMENTS 5,375,191 12/1994 Franz .................. 395/109

FOREIGN PATENT DOCUMENTS

| 0513989 | 11/1992 | European Pat. Off. | ......... B41J 2/205 |
| 0580376 | 1/1994 | European Pat. Off. | ......... G06K 15/10 |
| 0582433 | 2/1994 | European Pat. Off. | ......... G06K 15/10 |
| 0625765 | 11/1994 | European Pat. Off. | ......... G06K 15/10 |
| 0650140 | 4/1995 | European Pat. Off. | ......... G06K 15/10 |

OTHER PUBLICATIONS

Patent Abstracts of Japan, vol. 18, No. 115 (M-1566) Feb. 24, 1994 & JP-A-05 309 871 (Ricoh Co Ltd) Nov. 22, 1993 **abstract.

Patent Abstracts of Japan, vol. 10, No. 10 (M-446) Jan. 16, 1986 & JP-A-60 172 548 (Oki Denki Kogyo KK) Sep. 6, 1985 **abstract.

Patent Abstracts of Japan, vol. 13, No. 36 (M-790) Jan. 26, 1989 & JP-A-63 247 039 (NEC Corp.) Oct. 13, 1988 **abstract.

*Primary Examiner*—Thomas D. Lee
*Assistant Examiner*—Jerome Grant, II
*Attorney, Agent, or Firm*—Sughrue, Mion, Zinn, Macpeak & Seas, PLLC

[57] ABSTRACT

An image forming apparatus that is capable of saving developing agents such as toner and ink by reducing the number of dots in an image while ensuring that the characters and figures in the image are nonetheless represented distinctly. Bit map data is read out from buffer 23 and a set of three-pixel bits are held in both a vertical and a horizontal direction, with the pixel of interest being located in the center. On the basis of this set of bits, upper/lower edge detector circuit 59 and right/left edge detector circuit 61 determine whether the pixel of interest is positioned in any one of the edges of the pattern in the image to be printed. Additionally, dot-saved pattern generator circuit 67 performs dot reduction on the bit for the pixel of interest. The edge detection signals from the edge detector circuits 59 and 61 are supplied to OR gate 65, where they are ORed with the bit for the pixel of interest that is supplied from the dot-saved pattern generator circuit 67 after dot reduction. The logic sum signal from OR gate 65 represents bit map data which, as compared with the initial bit map data, has the edges of the pattern left intact and has the internal region of the pattern subjected to dot reduction. Printing is executed using this logic sum signal.

11 Claims, 6 Drawing Sheets

IMAGE FORMING APPARATUS AND METHOD HAVING A TONER AND INK SAVING FEATURE

FIELD OF THE INVENTION

The present invention relates to an image forming apparatus applicable to terminal printers, copiers, facsimile equipment and the like. More particularly, the invention relates to an image forming technology capable of saving developing agents such as toner and ink.

BACKGROUND OF THE INVENTION

Certain models of page printers have the capability for saving toner whenever the toner is running low. For instance, the host computer can be used to instruct such printers to switch to TONER SAVE mode, or the operating panel of the printer itself can be used to effect the switchover. Then, during operation of the TONER SAVE mode, a given proportion of dots (e.g., 75%) is removed from the dot image to be printed, in order to reduce toner consumption.

A problem with printing in the TONER SAVE mode is the resulting deterioration in image quality due to the removal of dots from the dot image. The effect of dot reduction is particularly noticeable in image areas consisting of fairly fine lines, which, when printed in TONER SAVE mode, appear "scratchy" and cannot be printed distinctly. To avoid this problem, it is often necessary to cancel the TONER SAME mode. Even large patterns and thick lines are not problem-free because lighter tones and, hence, deteriorated aesthetic appearance will occur if dots are removed at an increased proportion.

OBJECTS OF THE INVENTION

One object, therefore, of the invention is to provide an image forming apparatus that is capable of saving developing agents such as toner and ink by reducing the number of dots in an image while still ensuring that the characters, figures and other patterns in the printed image are represented distinctly.

Another object of the invention is to provide an image forming apparatus that is convenient to use. This can be achieved through an improvement in the manner in which an image forming mode involving dot reduction is combined with an ordinary mode without dot reduction.

SUMMARY OF THE INVENTION

An image forming apparatus according to the first aspect of the invention includes:

edge detector means capable of analyzing initial bit map data and detecting bits corresponding to an edge of a dot pattern represented by the initial bit map data;

dot saving means for modifying the initial bit map data in such a way that dots are removed from a selected area of the dot pattern represented by the initial bit map pattern;

means for combining the modified bit map data from the dot saving means with the detected bits corresponding to the edge of the dot pattern from said edge detector means in such a way that the modification by the dot saving means is canceled for the detected edge bits; and means for drawing an image according to the bit map data delivered from the combining means.

In a preferred embodiment, the edge detector means has edge selector means by which various different edges of the dot pattern can be selected depending on their location relative to the dot pattern (e.g. only the right edges, upper edges, etc. can be selected).

In another preferred embodiment, the dot saving means has means for varying the proportion of dots to be removed (i.e., the percentage of dot removal). More preferably, the dot saving means may further include means for detecting the amount by which the developing agent used in image formation has decreased, so that the dot removal proportion varying means can adjust the proportion according to the detected amount of decrease.

An image forming apparatus according to the second aspect of the invention comprises:

means for constructing fundamental bit map data according to data received from an external device;

dot saving means for modifying the fundamental bit map data in such a way that dots are removed from selected portions of the dot pattern represented by the fundamental bit map data;

mode selector means for selecting either one of two modes, the first mode for producing an image according to the fundamental bit map data and the second mode for producing the image according to the modified bit map data; and storage means which, when the image has been produced according to the second mode on the basis of the data received from the external device, stores the received data until after the image has been produced again on the basis of the same data.

The dot saving means in the image forming apparatus according to the first aspect of the invention performs dot reduction processing on the initial bit map data. Additionally, bits corresponding to an edge of a dot pattern are detected from the initial bit map data by the edge detector means. The combing means then combines the dot-reduced bit map pattern with the detected bits corresponding to edges, in such a manner that the operation of dot reduction is canceled for those areas of the dot-reduced bit map pattern which correspond to edges of the pattern.

As a result, the combining means will output bit map data comprising a dot pattern, the interior of which has been subjected to dot reduction but the edge of which has not. If this bit map data is used in image formation, an image is produced that is characterized by edge enhancement of the dot pattern, as compared to its interior. In other words, an image is produced in which the contours of characters, figures or other patterns are clearly represented by way of distinct dots, whereas the interiors of the characters, figures or patterns have a light tone, as a result of the operation of the toner-saving function, which reduces the overall number of dots printed.

The image forming apparatus may be equipped with edge selector means so that specific contours of the characters, figures or patterns oriented in specific directions are selected. Examples of such specific contours include upper, lower, right and left edges, which can be selected by way of the edge selector means, to insure that only the selected contours are represented distinctly.

The image forming apparatus may also be adapted to have a capability for varying the proportion at which dots are removed. This design allows a suitable dot removing proportion to be selected according to specific operational circumstances, e.g., the current amount of available toner.

The image forming apparatus according to the second aspect of the invention has a capability for selecting one of at least two modes. According to the first mode, the image is formed on the basis of fundamental bit map data that is substantially faithful to the data received from an external device. According to the second mode, the image is formed with dots removed in a suitable manner in order to reduce the consumption of developing agents. If the second mode is selected, the received data will be stored in the storage means provided even after image formation in that mode. Thereafter, when forming another image on the basis of the same data, the data already stored can be used, thus eliminating the need to retrieve the data from the external device a second time.

This image forming apparatus may be advantageously applied to a printer or the like when first making a draft quality print with a given proportion of dots removed and then making a letter quality print from the same original data. This offers a particular advantage because the time required for producing the letter quality print is shortened even while developing agent is saved when producing the draft quality print.

DETAILED DESCRIPTION OF THE PREFERRED EMBODIMENTS

Figure 1:
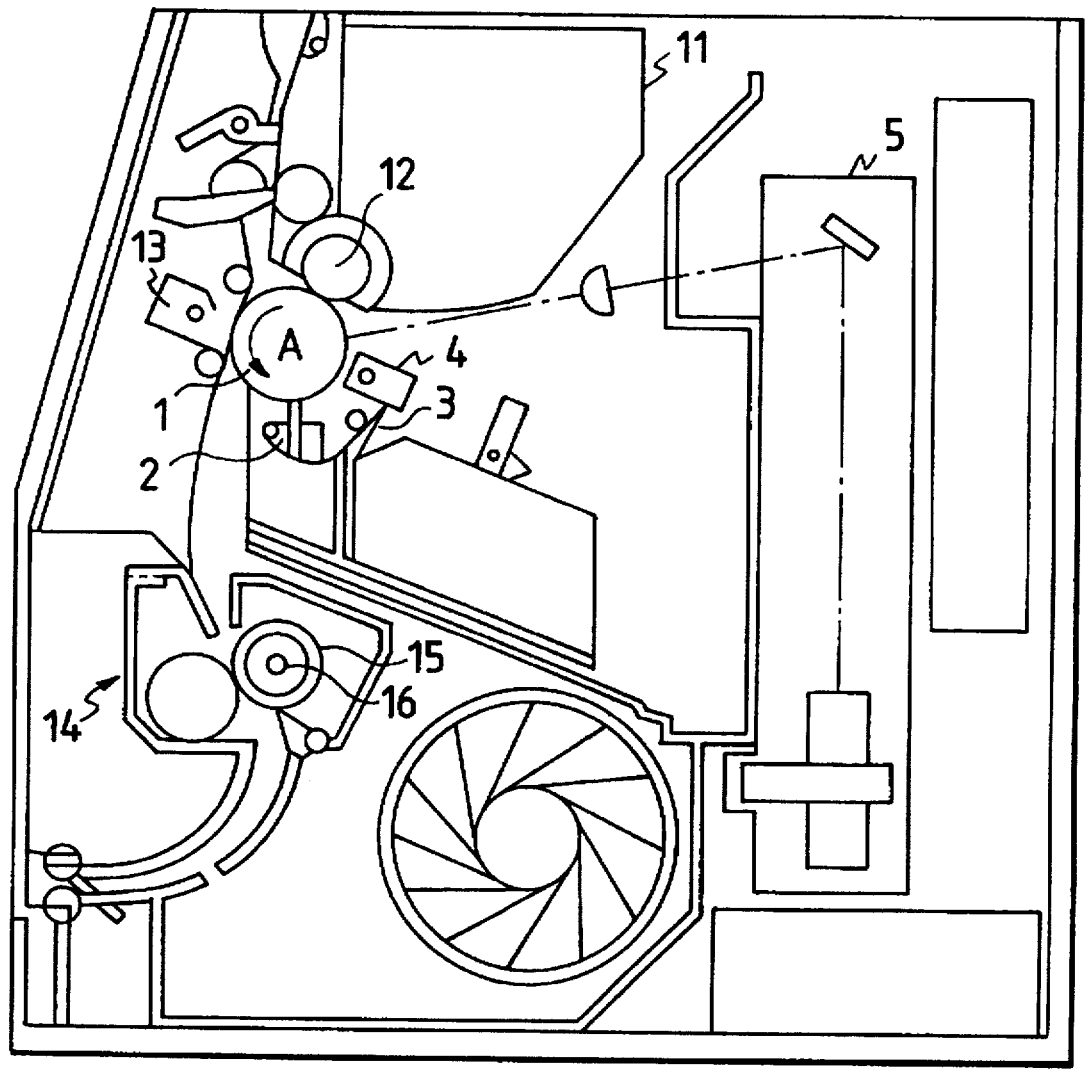
FIG. 1 is a cross sectional view showing the overall composition of a page printer, as an example of a device to which the present invention can be applied.

FIG. 1 shows the overall composition of a page printer as an example of the application of the present invention.

Referring to FIG. 1, a photoreceptor drum 1 has a photoconductive material layer formed on the circumference of a drum that is driven to rotate by means of a motor in the direction indicated by arrow A. Prior to the writing of bit map data, the photoreceptor drum 1 is cleared of the surface residual toner particles by means of a rubber blade 2 while, at the same time, the residual electric charges are removed by discharging upon uniform light illumination from an erase lamp 3. After this cleaning step, the photoreceptor drum 1 is supplied with ions that have been generated from a charge generator such as a corona discharge unit 4 so that it is charged to a specified surface potential. With these preliminary steps complete, the photoreceptor drum 1 is illuminated with a laser beam from a laser beam generator 5 so that a latent bit map image is written in a selected region.

The laser beam scans cyclically the surface of the photoreceptor drum 1 in a direction parallel to the rotating shaft (i.e., in the horizontal direction of the image to be printed). Since the photoreceptor drum 1 rotates during the cyclic scanning, its surface will be entirely covered with a raster image. The horizontal scanning by the laser beam is adjusted to be synchronous with the rotation of the photoreceptor drum 1 in such a way that each horizontal scanning by the laser beam is offset by a certain distance, say, 1/300 inch, in the peripheral direction (i.e., in the vertical direction of image). The laser beam is also subjected to 1,200 ON/OFF modulations as it travels a certain distance, say, 1 inch. As a result, the bit map image written onto the photoreceptor drum 1 will have a resolution of 300 dpi (vertical)×120 dpi (horizontal).

With the laser beam writing of the bit map image having been thus completed, those areas of the photoreceptor drum 1 which have not been illuminated with the laser beam will maintain a highly negative voltage but the illuminated areas will release the charged particles, whereupon the voltage will rise to a less negative value.

In a developing unit 11, the toner particles are rubbed against the latent image by means of a toner sleeve 12 in the selected areas of the photoreceptor drum 1 (where the writing of the latent bit map image has been effected) in accordance with the potential difference across the surface of the photoreceptor drum 1, whereby the toner is selectively adsorbed to convert the latent image into a toner image.

In a transfer unit 13, the toner images on the surface of the photoreceptor drum 1 are transferred onto a recording sheet. As the recording sheet in contact with the photoreceptor drum 1 is transported at the same speed as the peripheral speed of the photoreceptor drum 1, the voltage applied to the back side of the recording sheet attracts the toner particles so that they are adsorbed onto the surface of the recording sheet. The photoreceptor drum 1 will keep rotating and is cleared of the residual charges in the cleaning step to be prepared for the next cycle of electrostatic latent image formation.

In a thermal fixing unit 14, the toner image that has been transferred onto the recording sheet is thermally fused so that it is permanently fixed on the latter. The thermal fixing unit 14 comprises a roller 15 with a built-in heater 16 and it heats the toner image on the recording sheet under pressure so that the toner particles are fused to the recording sheet.

Figure 2:
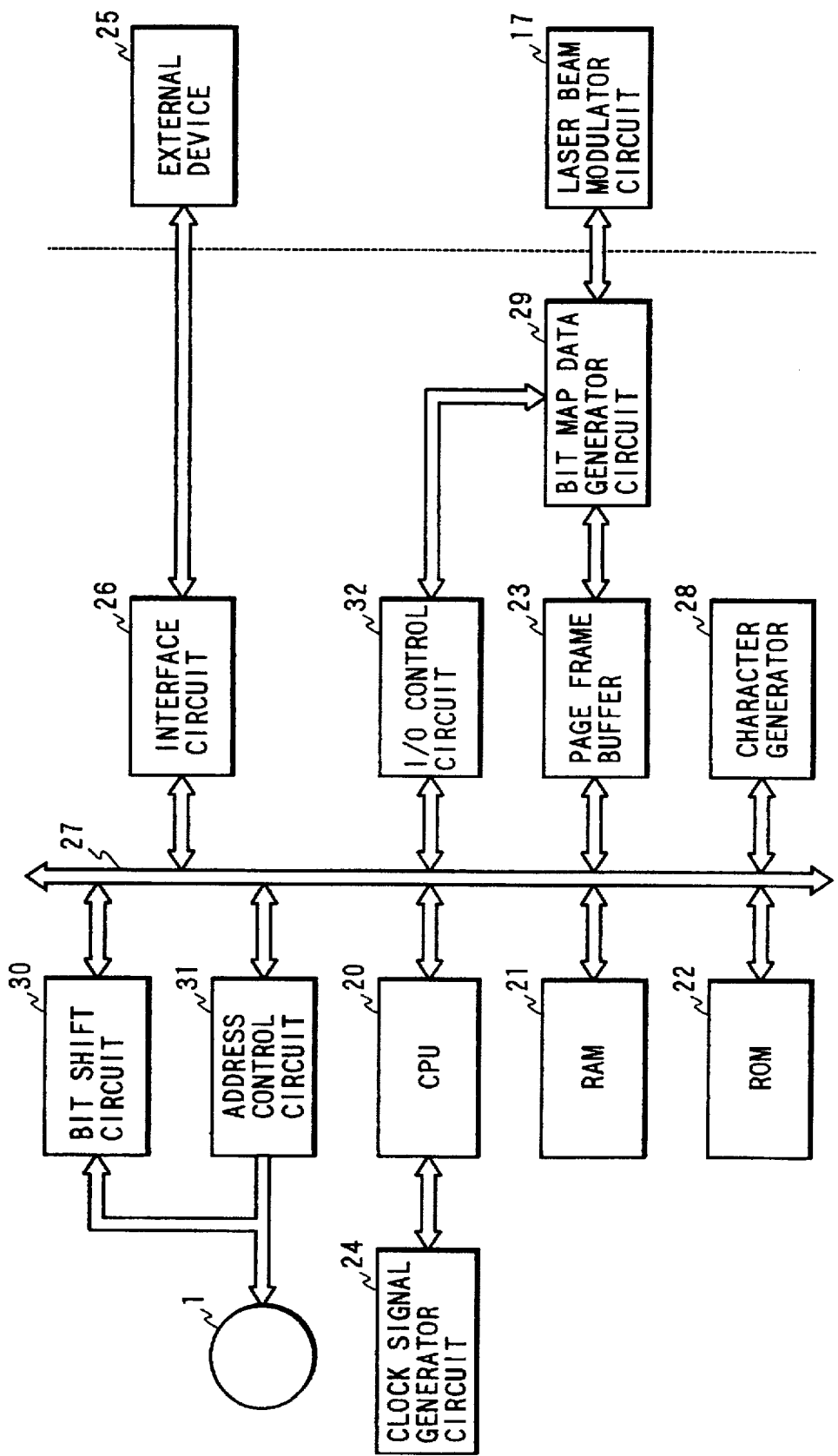
FIG. 2 is a block diagram showing the hardware configuration of the control system used in accordance with a preferred embodiment of the present invention.

FIG. 2 shows a hardware configuration for a control system that coordinates the operations performed by the printing steps described above.

The control system constructs bit map data corresponding to the printing data as received from an external device and controls the operations of the laser beam generator 5, the drive mechanism of the photoreceptor drum 1 and related components. The control system comprises the following components: a microcomputer comprising a central processing unit (CPU) 20, a RAM 21 consisting of a main storage device and work areas, and a ROM 22 storing the CPU operating program; a character generator 28 with a built-in font for converting the character codes within the printing data to bit map data of characters; and a page frame buffer 23 for storing bit map data for pages of images that have been generated on the basis of the printing data.

CPU 20 is supplied with clock signals from a clock signal generator circuit 24. The printing data as received from an external device 25 such as a personal computer is passed through an interface circuit 26 to be taken into a bus 27, processed by a printer control command, converted to fundamental bit map data for modulating a laser beam, and stored in the page frame buffer 23. The fundamental bit map data may typically have a resolution of 300 dpi (vertical)× 300 dpi (horizontal).

The fundamental bit map data is in turn subjected to dot reduction for toner saving, as well as dot addition/removal for edge smoothing by means of a bit map data generator circuit 29 as will be mentioned hereinafter, whereupon it is eventually converted to data having a resolution of, say, 300 dpi (vertical)×1,200 dpi (horizontal). This final bit map data is delivered as output to a laser beam modulator 17 which will perform ON/OFF modulation on the laser beam as already described above. CPU 20 also controls the drive of photoreceptor drum 1 via a bit shift circuit 30 and an address control circuit 31 so that it will rotate at a speed suitable for the writing of bit map data.

Additionally, CPU 20 controls the operation of the bit map data generator circuit 29 via an I/O control circuit 32. To this end, a video clock signal synchronous with the period of ON/OFF modulation of the laser beam, a horizontal sync signal synchronous with the period of horizontal scanning by the laser beam, a TONER SAVE signal indicating whether the TONER SAVE mode is on or off, edge selection data to be described hereinafter, dot-saved pattern data also to be described hereinafter and the like are supplied by CPU 20 to the bit map data generator circuit 29 via I/O control circuit 32.

In response to these signals as supplied from the I/O control circuit 32, the bit map data generator circuit 29 will perform dot reduction for toner saving, as well as dot addition/removal for edge smoothing.

Figure 3:
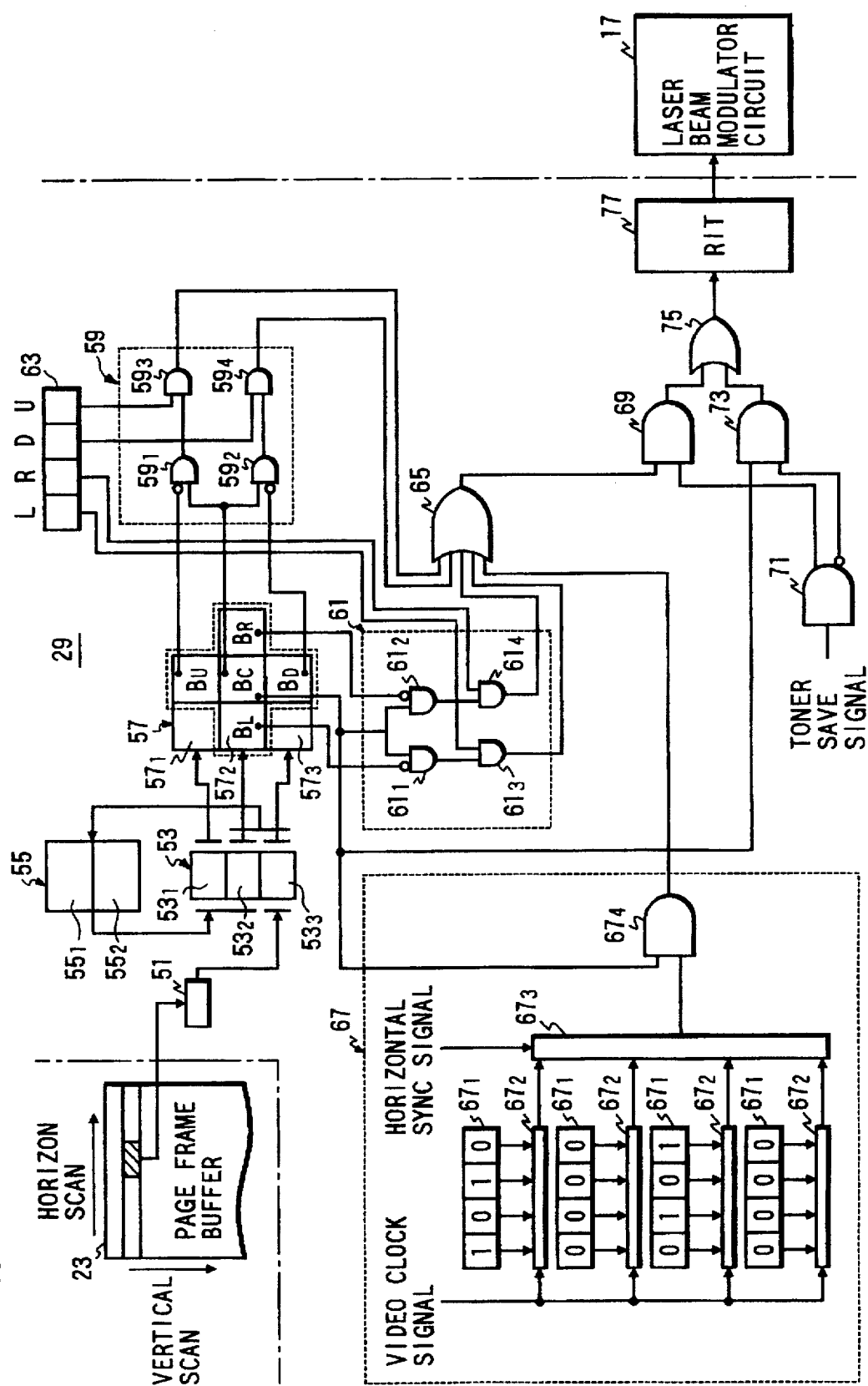
FIG. 3 is a block diagram showing the configuration of a bit map data generator circuit forming part of the control system of FIG. 2.

FIG. 3 shows in detail the configuration of that portion of the bit map data generator circuit 29 which performs the necessary processing for toner saving.

Referring to FIG. 3, the page frame buffer 23 stores bit map data for images corresponding to a predetermined number of pages. Bit map data for the page of images to be printed are read out of the page frame buffer 23 at timings determined by the horizontal sync signal and the video clock signal. The order of reading the bit map data is the same as the order in which bit map data are entered into the laser beam modulator circuit 17 of the laser beam generator 5; thus, the reading starts with the topmost horizontal line with the image and subsequent horizontal lines are successively scanned horizontally. The horizontal scanning of each line is synchronous with the period of the horizontal sync signal.

The bit map data are read out in parallel bytes corresponding to eight pixels arranged side by side (horizontally) within the image and thereafter supplied into a parallel-serial converter circuit 51 for conversion to serial bytes. The bits in each serial byte are supplied successively into a latch array 53 in synchronism with video clock signals.

Latch array 53 consists of three latches $53_1$ to $53_3$ for holding three pixel bits arranged vertically within the image. The bits delivered from the parallel-serial converter circuit 51 are latched in latch $53_3$ for the pixel in the lowest position of the three pixels. In synchronism with the latching of this bit, latches $53_1$ and $53_2$ for the top two pixels will latch the upper and lower pixels being delivered from a memory 55. In synchronism with respective video clock signals, the latches $53_1$ to $53_3$ will supply a shift register array 57 with the bits that were latched in response to the previous video clock signals while, at the same time, they latch the next three pixel bits that are being supplied from the parallel-serial converter circuit 51 and the memory 55.

Memory 55 consists of two FIFO memories $55_1$ and $55_2$ each having a capacity for holding one horizontal line of bits within the bit map data. In synchronism with video clock signals, the memory 55 supplies latches $53_1$ and $53_2$ for the top two pixels with the upper and lower pixel bits that have been stored the first of all the bits stored in two lines while, at the same time, the memory 55 stores the upper and lower pixel bits that are being delivered from latches $53_2$ and $53_3$ for the bottom two pixels.

By being operated in combination with the memory 55, the latch array 53 will hold vertically arranged three pixel bits, which are updated one pixel at a time in the vertical scanning direction in synchronism with video clock signals; additionally, those bits are updated by one line (or pixel) in the vertical scanning direction in synchronism with horizontal sync signals.

The three pixel bits in the latch array 53 are supplied into the shift register array 57 in synchronism with video clock signals. The shift register array 57 consists of three shift registers $57_1$ to $57_3$ in association with the three pixels. Shift registers $57_1$ and $57_3$ which correspond to the top and bottom pixels are each composed of two stages whereas the shift register $57_2$ corresponding to the center pixel consists of three stages. The three pixel bits delivered from the latch array 53 are supplied simultaneously into the three shift registers $57_1$ to $57_3$ at the initial stage and then shifted toward subsequent stages of the respective shift registers in synchronism with video clock signals.

Let us focus our attention at the pixel of bit $B_C$ which is held at the second stage of the central shift register $57_2$ and designate it as "the pixel of interest" That portion of the shift register array 57 which is enclosed with a dashed line holds a bit set consisting of three pixels in each of the vertical and horizontal directions with the pixel of interest being located in the center.

Among the bits in this set, bits for the three vertical pixels, $B_U$, $B_C$ and $B_D$, are supplied into an upper/lower edge detector circuit 59, whereas bits for the three horizontal pixels, $B_L$, $B_C$ and $B_R$, are entered into a right/left edge detector circuit 61. The two edge detector circuits 59 and 61 have the same configuration and by checking whether the bit for the pixel of interest $B_C$ is of the same value as the bit for either one of the four adjacent pixels in the upper, lower, right and left positions, those circuits will determine as to whether the pixel of interest is located in either one of the upper, lower, right and left edges of the pattern to be printed.

Consider, for example, the upper/lower edge detector circuit 59. AND gate $59_1$ receives the bit for the pixel of interest $B_C$ and an inversion of the bit for the upper adjacent pixel $B_U$ and will output signal "1" only in the case where $B_C$ is "1" (black) and $B_U$ is "0" (white), namely, when the pixel of interest is located in an upper edge of the pattern. AND gate $59_2$ receives $B_C$ and an inversion of the bit for the lower adjacent pixel $B_D$ and will output signal "1" only in the case where $B_D$ is "1" (black) and $B_D$ is "0" (white), namely, when the pixel of interest is located in a lower edge of the pattern. The output signal from AND gate $59_1$ is supplied to AND gate $59_3$ together with the bit at the rightmost end of a mask register 63 (see FIG. 3). The output signal from AND gate $59_2$ is supplied to AND gate $59_4$ together with the bit located at the position second from the right end of the mask register 63.

The mask register 63 is a 4-bit register and holds 4-bit edge selection data as supplied from the CPU 20. The four bits in the edge selection data correspond to the four kinds of edges of the pattern to be printed; the bit at the rightmost end corresponds to an upper edge, the bit which is second from the right end corresponds to a lower edge, the bit which is third from the right end corresponds to a right edge, and the bit at the leftmost end corresponds to a left edge. If any one of these bits is "1", the corresponding edge will be selected and if any one of them is "0", the corresponding edge will not be selected. The selected edge will not be subjected to dot reduction even in the TONER SAVE mode and all dots will be left intact (i.e., the selected edge will necessarily be printed). The edge selection data may be so set that the user has available the full range of options from ALL BIT "1" (meaning all edges are selected) to ALL BIT "0" (meaning neither edge is selected); alternatively, the edge selection data may be so set that the user will select the most appropriate from several preset choices.

Because of the arrangement described above, AND gate $59_3$ in the upper/lower edge detector circuit 59 will produce "1" as the output signal $Q_U$ only in the case where the edge selection data in the mask register 63 selects an upper edge and when the pixel of interest is positioned in an upper edge; and AND gate $59_4$ will produce "1" as the output signal $Q_D$ only in the case where the edge selection data selects a lower edge and when the pixel of interest is positioned in a lower edge.

Similarly, AND gate $61_3$ in the right/left edge detector circuit 61 will produce "1" as the output signal $Q_L$ only in the case where the edge selection data in the mask register 63 selects a left edge and when the pixel of interest is positioned in a left edge; and AND gate $61_4$ will produce "1" as the output signal $Q_R$ only in the case where the edge selection data selects a right edge and when the pixel of interest is positioned in a right edge.

The output signals $Q_U$ and $Q_D$ from the upper/lower edge detector circuit 59 and the output signals $Q_L$ and $Q_R$ from the right/left edge detector circuit 61 are supplied to an OR gate 65, which is also supplied with an output signal from a dot-saved pattern generator circuit 67.

The dot-saved pattern generator circuit 67 generates bit map data that has been subjected to dot reduction for use in the TONER SAVE mode. The dot-saved pattern generator circuit 67 comprises the following components: dot-saved pattern registers $67_1$ that store the dot-saved pattern data as supplied from the CPU 20. In the example under discussion, the data is bit map data that has the dots (black pixels) reduced in number to 25% of the initial value for the region consisting of 4 pixels in each of the vertical and horizontal directions. Horizontal position selectors $67_2$ that designate the horizontal position of a single bit as it is read from one of the dot-saved pattern registers $67_1$; a vertical position selector $67_3$ that designates the vertical position of a single bit as it is read from one of the dot-saved pattern registers $67_1$; and an AND gate $67_4$ that is supplied with both the bit from one of the dot-saved pattern registers $67_1$ and the bit for the pixel of interest from the shift register $57_2$ and which generates a signal as the output of the dot-saved pattern generator circuit 67.

The horizontal position selectors $67_2$ operate in synchronism with video clock signals to update successively the horizontal bit positions as being read out of the dot-saved pattern registers $67_1$. The vertical position selector $67_3$ operates in synchronism with horizontal sync signals to update successively the vertical bit positions as being read out of the dot-saved pattern registers $67_1$. Thus, the bit for a pixel that is located within the 4×4 pix dot-saved pattern and which corresponds in position to the pixel of interest will be read out of the dot-saved pattern registers $67_1$. The bit as read from the dot-saved pattern is supplied to the AND gate $67_4$ together with the bit for the pixel of interest; hence, the AND gate $67_4$ will output a bit that is produced after the pixel of interest has been subjected to dot reduction in accordance with the dot-saved pattern.

The output bit from AND gate $67_4$ is supplied to an OR gate 65 together with the output signals $Q_U$, $Q_D$, $Q_L$ and $Q_R$ from the edge detector circuits 59 and 61. Hence, the output signal from the OR gate 65 is invariably "1" when the pixel of interest is positioned in the selected edge of the pattern to be printed; on the other hand, if the pixel of interest is positioned within the pattern to be printed, the bit value of the dot-saved pattern is either "0" or "1". The output signal from the OR gate 65 is supplied to an AND gate 69, which is also supplied with a TONER SAVE signal from the CPU 20 via a gate 71. Therefore, AND gate 69 will pass the output signal from the OR gate 65 only when the TONER SAVE signal is "1" (i.e., the TONER SAVE mode is on).

Another AND gate 73 is supplied with the original bit for the pixel of interest and the TONER SAVE signal as inverted by the gate 71. Therefore, AND gate 73 will pass the original bit for the pixel of interest only when the TONER SAVE signal is "0" (i.e., the TONER SAVE mode is off).

When the TONER SAVE mode is on, the output signal from the OR gate that has passed through the AND gate 69 is passed through an OR gate 75 to enter an RIT circuit 77 for edge smoothing. This is also true for the case where the TONER SAVE mode is off, except that the input to the RIT circuit 77 is the original bit for the pixel of interest that has passed through the AND gate 73.

The input bit map data (300 dpi×300 dpi) to the RIT circuit 75 is subjected to a modification for smoothing out the irregularities in the edges of the pattern to be printed, whereby the data is eventually converted to bit map data having a resolution of 300 dpi×12,000 dpi for subsequent delivery to the laser beam modulator circuit 17. An example of the RIT circuit 75 that may be used in the invention is described in JPA 93/64923.

FIGS. 4 to 7 show the pattern "$" as an example of the bit map pattern (to be supplied into the RIT circuit 75) after having passed through the toner saving circuitry depicted in FIG. 3. The areas filled with solid black circles are those where all dots are left for printing even in the TONER SAVE mode and the areas filled with open white circles are those where printing is done with a certain number of dots reduced according to the dot-saved pattern in the TONER SAVE mode.

Figure 5:
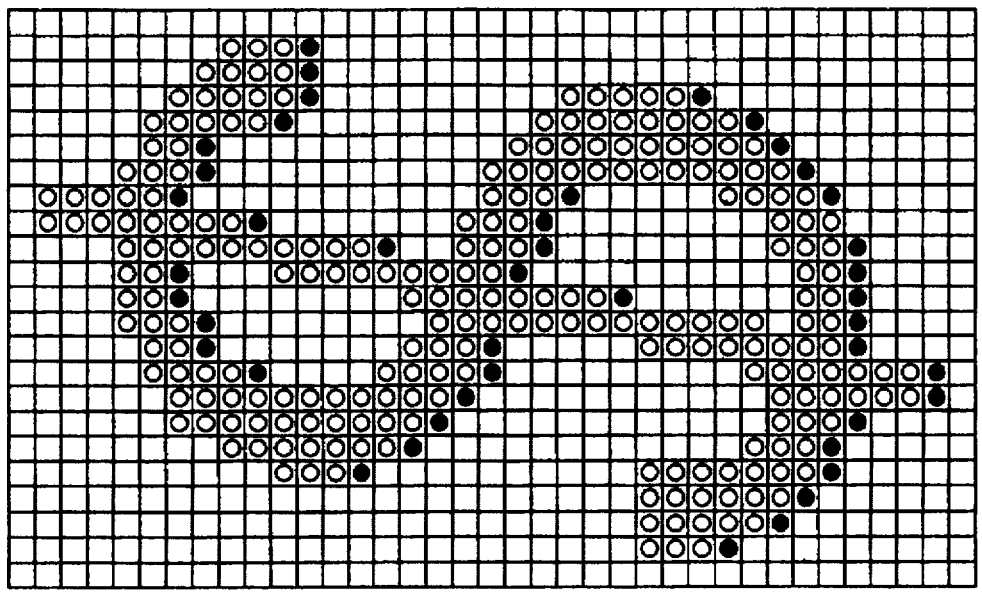
FIG. 5 illustrates a dot pattern output as produced in accordance with the invention when printing in the TONER SAVE mode with lower edges selected.
Figure 4:
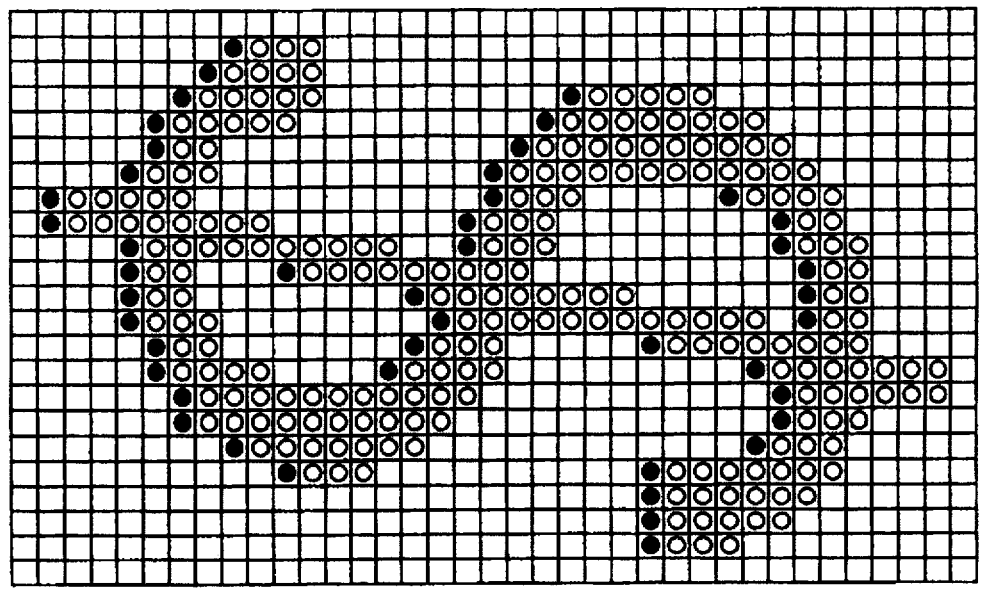
FIG. 4 illustrates a dot pattern output as produced in accordance with the invention when printing in the TONER SAVE mode with upper edges selected.
Figure 7:
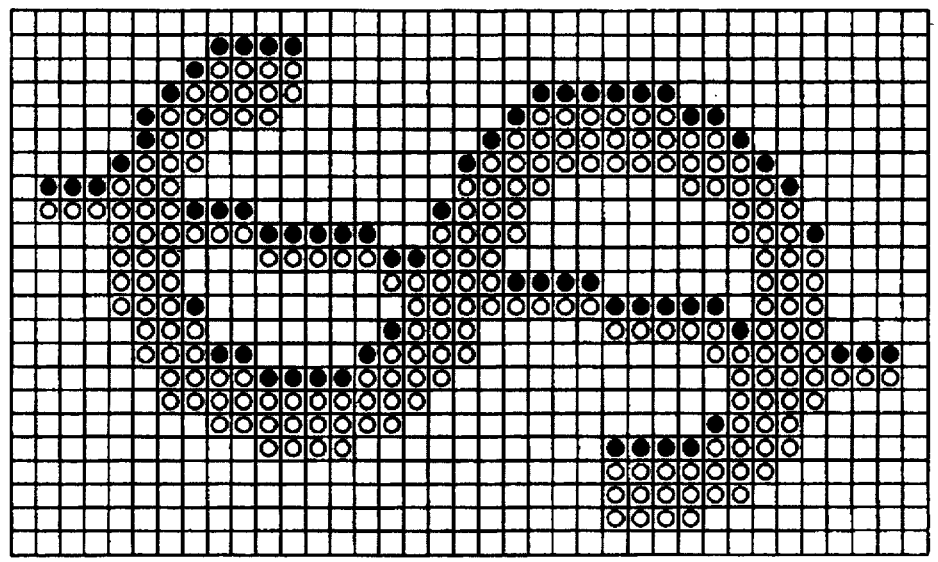
FIG. 7 illustrates a dot pattern output as produced in accordance with the invention when printing in the TONER SAVE mode with right edges selected.
Figure 6:
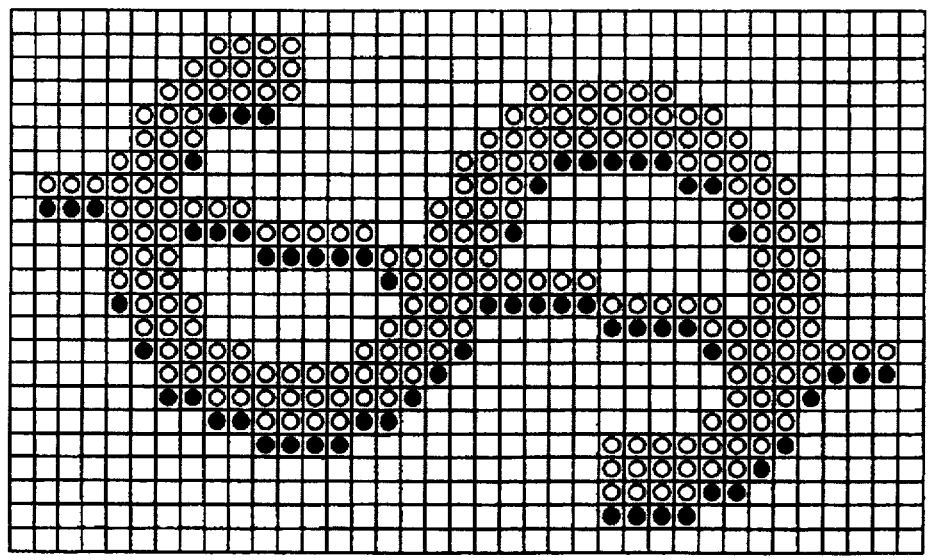
FIG. 6 illustrates a dot pattern output as produced in accordance with the invention when printing in the TONER SAVE mode with left edges selected.

FIG. 4 shows the case where only upper edges are selected by means of the edge selector data; FIG. 5 shows the case where only lower edges are selected; FIG. 6 shows the case where only left edges are selected; and FIG. 7 shows the case where only right edges are selected. As one can see from these figure, the dots in the selected edges of the pattern "$" are not reduced in number but all of them are left intact even in the TONER SAVE mode, thereby enabling the pattern to be printed in a distinct manner. The vertical line running through the center of the pattern is relatively thin and if the entire region including the edge portion were subjected to dot reduction, it would most probably be difficult for the vertical line to be recognized as a distinct entity; in fact, however, the upper edges of the necessary portions of the vertical line are left intact to ensure that it is readily recognizable as a vertical line. On the other hand, the S-curved line of the pattern is relatively thick, so even if the upper edges of selected portions of the "S" are left intact, there is obtained a toner saving effect that is comparable to what would be attained by performing dot reduction on the entire region and, in addition, the remaining edges provides greater ease in the recognition of the printed pattern.

Thus, by leaving only certain edges intact in the TONER SAVE mode, fine lines and small patterns can be printed to provide an improved aesthetic appearance while suppressing the otherwise occurring pattern deterioration due to dot reduction, whereas thick lines and large patterns are printed not only to provide an improved aesthetic appearance but also to exhibit the satisfactory toner saving effect of dot reduction.

As a further advantage, the improvement in the aesthetic appearance of the printed pattern due to the intact edges insures that the percentage of dot reduction to produce a dot-saved pattern can be increased by a corresponding amount compared to the prior art technology. Increasing the percentage of dot reduction is particularly beneficial to the case of printing an image containing many large patterns since the toner saving effect that can be expected is greater than in the prior art.

The method of edge selection is in no way limited to leaving only edges of one side as shown in FIGS. 4 to 7 but many variations are possible, including the case where both upper and lower edges or both right and left edges are left intact, the case where either an upper or a lower edge and either a right or a left edge are left intact, and the case where not only upper and lower edges but also right and left edges are all left intact. In any event, edge selection depends on various factors such as the degree by which the toner is to be saved and the characteristic features of the patterns included in the image to be printed. Stated more specifically, the number of edge types to be selected should be minimized if a greater toner saving effect is desired whereas selecting an increased number of edge types is more effective in toner saving if deteriorated aesthetic appearance is to be avoided. Turning back to FIGS. 4 to 7 which show the case of selecting edges of only one side of a letter that contains many fine vertical lines, the aesthetic appearance that can be achieved by leaving either right or left edges is better than what is produced by leaving either upper or lower edges.

The example under discussion also allows for the dot-saved pattern to be set in any desired manner. The patterns shown in FIGS. 4 to 7 are all subjected to 75% dot reduction (the number of dots has been reduced to 25% of the initial value) but the percentage of dot reduction may be adjusted in accordance with the degree by which the toner is to be saved. The adjustment may be performed manually by the user or the number of dots may be reduced automatically in accordance with how much of the toner has decreased (which may be estimated from the integrated number of dots that have been printed in the past). If desired, the TONER SAVE mode may be turned on or off manually or, alternatively, it may be automatically turned on when the residual amount of the toner has dropped below a threshold level (which may be detected with a sensor in the toner tank).

Additionally, the TONER SAVE mode may be turned on or off independently of the quantity of residual toner but depending on whether the print quality to be obtained is draft or letter quality. To this end, a special switch, or a PRINT MODE SELECT button for selecting between DRAFT, LETTER or ORDINARY, is provided on the printer's operating panel (alternatively, a similar selection command may be provided in a printer driver which is an external device). If printer data is sent from the external device with the PRINT MODE SELECT button depressed to select draft-quality printing, the printer will automatically print in the TONER SAVE mode; thereafter, the button is depressed to select letter-quality printing and the printer will print using the same printing data but with the TONER SAVE mode off. This offers great convenience to the user.

Figure 8:
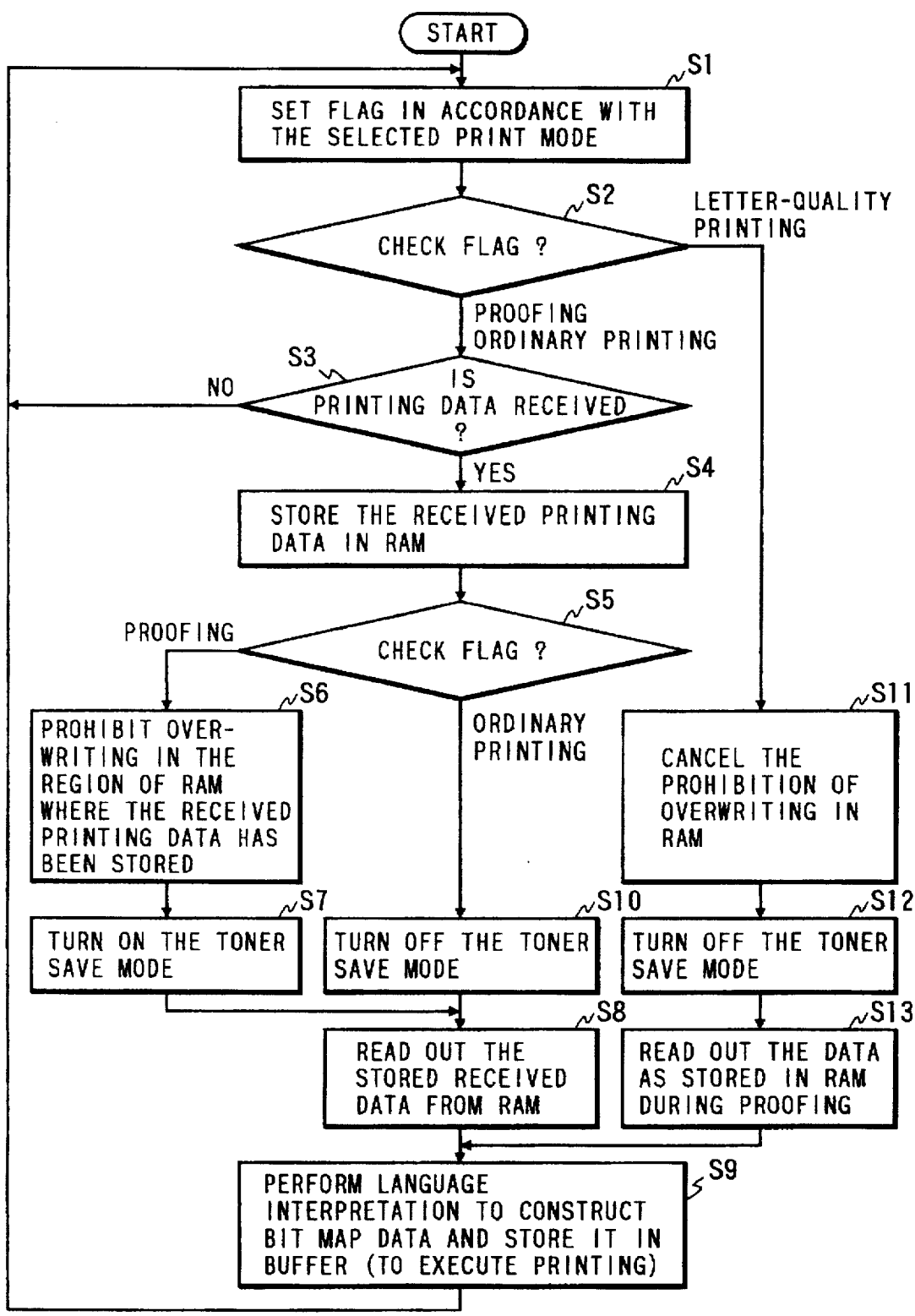
FIG. 8 is a flowchart showing a sequence of processing for the CPU in the control system, according to the invention.

FIG. 8 shows a flowchart for the operation of the CPU 20 (see FIG. 2) which performs selective printing to produce draft or letter quality.

First, the CPU 20 checks which of the three modes has been selected, in response to actuation of the PRINT MODE SELECT button. Then the CPU sets a relevant print mode flag (Step S1). Let us suppose for the purpose of the present discussion that the flag for draft-quality printing is set.

The CPU 20 then checks the print mode flag (S2). Since the flag is set other than for letter-quality printing, the CPU 20 then checks whether printing data has been received from the external device 25 (S3). If the answer is yes, the received printing data is temporarily stored in RAM 21 (S4).

The CPU 20 re-checks the print mode flag (S5). Since draft-quality printing has been selected, the CPU 20 instructs against overwriting in the region of RAM 21 where the received printing data has been stored (S6). Further, the CPU 20 instructs the bit map data generator circuit 29 via the I/O control circuit 32 to turn on the TONER SAVE mode signal while, at the same time, it supplies the circuit 29 with both edge selection data and dot-saved pattern data which have been prepared for draft-quality printing (S7).

Subsequently, the CPU 20 reads the received printing data from the RAM 21 (S8) and performs language interpretation to construct corresponding bit map data, which is then written into the page frame buffer 23 (S9). The bit map data is forwarded to the bit map data generator circuit 29, where it is subjected to processing for toner saving and edge smoothing before being sent to the laser modulator circuit 17. As a result, draft-quality printing, or proofing, is done in the TONER SAVE mode.

After the end of proofing, the processing with CPU 20 returns to step S1. Suppose here that the user depresses the PRINT MODE SELECT button to set the print mode for ORDINARY printing.

In this case, the CPU 20 sets the print mode flag for ordinary printing (S1). If new printing data is thereafter received (S3), it is temporarily stored in RAM 21 (S4). Since overwriting in the region of RAM 21 that stores the printing data as received for proofing is prohibited, the new printing data will be stored in a different region.

In ordinary printing, the CPU 20 subsequently instructs the bit map data generator circuit 29 to turn off the TONER SAVE mode (S10). Thereafter, the CPU 20 reads the printing data out of the RAM 21, performs language interpretation to construct bit map data and writes it into the page frame buffer 23 (S8 and S9). As a result, ordinary printing is done with the TONER SAVE mode off.

After the end of ordinary printing, the processing with CPU 20 returns step S1. Let us assume here that the user depresses the PRINT MODE SELECT button to select letter-quality printing.

In this case, the CPU 20 sets the print mode flag for letter-quality printing (S1). The CPU 20 then checks the print mode flag (S2). Since the print mode flag has been set for letter-quality printing, the CPU 20 subsequently instructs the bit map data generator circuit 29 to turn off the TONER SAVE mode (S11) and cancels the prohibition of overwriting in the region of RAM 21 where the printing data as received in the proofing has been stored (S12). Subsequently, the CPU 20 reads that printing data out of the RAM 21 (S13), constructs bit map data and stores it in the page frame buffer 23. As a result, letter-quality printing is executed with the TONER SAVE mode off.

In the processing just described above, the data used for proofing is stored as such in the printer and if letter-quality printing is to be done using the same data, the need to resend printing data from the external device 25 is obviated and this offers convenience by shortening the time required to perform letter-quality printing. As a further advantage, the sequence of two printing operations, one being for draft quality and the other for letter quality, can be interrupted by performing ordinary printing using another set of printing data.

To allow for the case where the printer under consideration does not perform letter-quality printing using the same data that has been used in proofing, it is desirable to provide a button (or command) for canceling the prohibition against overwriting in the region where that printing data has been stored (or erasing that data).

While preferred embodiments of the present invention have been described above, it should be noted that the invention can be implemented in various other embodiments without departing from the spirit of the invention.

For example, the dot-saved pattern may be other than of the 4×4 pixel size.

If the characters or patterns within the image to be printed are of a suitable size, selected edges can be left intact in the TONER SAVE mode to thereby save the toner while preventing image deterioration, as disclosed by the foregoing embodiment. However, if the size of characters or patterns is unduly small, the toner saving effect will decrease. To deal with this problem, the printer may be so designed that it checks the size of characters or patterns within the image to be printed (the size may be the basic point size of characters in a text) and if the size is smaller than a specified value, no edges will be left intact but the percentage of dot reduction to produce a dot-saved pattern is made smaller than a standard value, thereby achieving toner saving.

The edges that are left intact in the foregoing embodiment are fixed in thickness (1-pixel thick) but, if any edges are to be left intact, their thickness may be variable to 2 pixels or more. In the embodiment, all parts of the selected edge are left intact but, if desired, a selected edge may be subjected to dot reduction that is performed at a smaller percentage than in the interior of a pattern having that edge.

It should also be mentioned that the image forming apparatus of the invention is applicable not only to a page printer but also for the purpose of saving the ink used by ink jet printers or the toner used by copiers and facsimile equipment.

Thus, according to a first aspect of the present invention, an output image is produced by removing dots from the interior of the image-representing dot pattern, with edges of the pattern being more enhanced than its interior. As described, this is effective in saving developing agents such as toner and ink while suppressing the deterioration of the aesthetic appearance of the output image due to dot reduction.

According to a second aspect of the invention, an image is first formed in trial based on the data as received from the external device with the TONER SAVE mode on; thereafter, letter-quality image is formed based on the same data but with the TONER SAVE mode turned off. Since there is no need to send the same data again from the external device when printing a letter-quality text, the time required for final printing is shortened.

We claim:

1. An image forming apparatus that uses a developing agent to produce an image composed of dot patterns, comprising:

edge detector means for receiving initial bit map data and detecting bits corresponding to an edge of a dot pattern represented by the initial bit map data;

dot saving means for receiving the initial bit map data and modifying the initial bit map data by removing dots from selected portions of the dot pattern represented by the initial bit map data;

means for combining the modified bit map data from said dot saving means with said detected bits from said edge detector means in such a way that edge bits from the modified bit map data that correspond to the detected bits of the edge of the dot pattern are replaced by the detected bits corresponding to the edge of the dot pattern, thereby forming combined bit map data;

a selecting circuit receiving the combined bit map data as a first input and receiving the initial bit map data as a second input and producing as an output selected bit map data which is selected from the first and second inputs based upon a toner saving selection signal;

an edge smoothing circuit receiving the selected bit map data as an input and producing edge-smoothed bit map data as an output; and means for producing the image according to the edge-smoothed bit map data output from said edge smoothing circuit.

2. An image forming apparatus according to claim 1 wherein said edge detector means comprises edge selector means for selecting at least one edge orientation to be detected from different edge orientations of the dot pattern.

3. An image forming apparatus according to claim 1 wherein said dot saving means comprises setting means for setting a dot removal proportion.

4. An image forming apparatus according to claim 1, wherein said combining means comprises ORing means.

5. An image forming apparatus that uses a developing agent to produce an image composed of dot patterns, comprising:

edge detector means for receiving initial bit map data and detecting bits corresponding to an edge of a dot pattern represented by the initial bit map data;

dot saving means for receiving the initial bit map data and modifying the initial bit map data by removing dots from selected portions of the dot pattern represented by the initial bit map data;

means for combining the modified bit map data from said dot saving means with said detected bits from said edge detector means in such a way that edge bits from the modified bit map data that correspond to the detected bits of the edge of the dot pattern are replaced by the detected bits corresponding to the edge of the dot pattern; and means for producing the image according to the bit map data output from said combining means;

wherein said dot saving means comprises setting means for setting a dot removal portion, and wherein said dot saving means further comprises means for gauging an amount of remaining developing agent and for controlling said setting means in accordance with the amount gauged.

6. An image forming apparatus that uses a developing agent to produce an image composed of dot patterns, comprising:

means for constructing fundamental bit map data representing the dot patterns according to data received from an external device;

means for storing the fundamental bit map data during an image producing operation;

dot saving means for modifying the fundamental bit map data by removing dots from selected portions of the dot patterns represented by the fundamental bit map data;

mode selector means for selecting either a first image producing operation mode or a second image producing operation mode, whereby the first mode produces the image according to the fundamental bit map data and the second mode produces the image according to the modified bit map data; and storage retaining means for monitoring said mode selector means and controlling said storage means such that, if the image has been produced by way of the second mode, said storage retaining means causes said storage means to retain the stored fundamental bit map data until the image has been produced again by way of the first mode.

7. A method for operating a printing device in a secondary mode which consumes less developing agent that a primary mode of the printing device, comprising the steps of:

(a) subjecting input bit map data representing image dot patterns to an edge orientation routine which determines edge dots corresponding to at least one edge orientation of each of the dot patterns;

(b) subjecting the input bit map data to a dot reduction routine which eliminates dot information from each of the dot patterns in accordance with a predetermined dot reduction algorithm, to provide modified dot pattern data;

(c) overriding the dot reduction routine for the determined edge dots, such that no dot information is eliminated for the edge dots, to provide edge dot pattern data which is combined with said modified dot pattern data to provide combined dot pattern data;

(d) selecting whether toner saving takes place by choosing as selected data either the input bit map data or the combined dot pattern data;

(e) edge smoothing the selected data; and (f) using the developing agent to print an image represented by the selected data which has been smoothed in step (e).

8. A method for operating a printing device in a secondary mode which consumes less developing agent that a primary mode of the printing device, comprising the steps of:

subjecting input bit map data representing image dot patterns to an edge orientation routine which determines edge dots corresponding to at least one edge orientation of each of the dot patterns;

subjecting the input bit map data to a dot reduction routine which eliminates dot information from each of the dot patterns in accordance with a predetermined dot reduction algorithm, to provide modified dot pattern data;

overriding the dot reduction routine for the determined edge dots such that no dot information is eliminated for the edge dots, to provide edge dot pattern data; and using the developing agent to print an image represented by the modified dot pattern data and the edge dot pattern data;

wherein said edge detection routine determines the edge dots corresponding to the at least one edge orientation by successively selecting each dot of each of the dot patterns and comparing bit map data for the selected dot with bit map data for at least one dot adjacent to the selected dot.

9. A method for operating a printing device in a secondary mode which consumes less developing agent that a primary mode of the printing device, comprising the steps of:

subjecting input bit map data representing image dot patterns to an edge orientation routine which determines edge dots corresponding to at least one edge orientation of each of the dot patterns;

subjecting the input bit map data to a dot reduction routine which eliminates dot information from each of the dot patterns in accordance with a predetermined dot reduction algorithm, to provide modified dot pattern data;

overriding the dot reduction routine for the determined edge dots, such that no dot information is eliminated for the edge dots, to provide edge dot pattern data; and using the developing agent to print an image represented by the modified dot pattern data and the edge dot pattern data;

wherein said edge detection routine determines the edge dots corresponding to the at least one edge by successively selecting each dot of each of the dot patterns and comparing bit map data for the selected dot with bit map data for at least one dot adjacent to the selected dot.

10. A method for operating a printing device in a secondary mode which consumes less developing agent that a primary mode of the printing device, comprising the steps of:

subjecting input bit map data representing image dot patterns to an edge orientation routine which determines edge dots corresponding to at least one edge orientation of each of the dot patterns;

subjecting the input bit map data to a dot reduction routine which eliminates dot information from each of the dot patterns in accordance with a predetermined dot reduction algorithm, to provide modified dot pattern data;

overriding the dot reduction routine for the determined edge dots, such that no dot information is eliminated for the edge dots, to provide edge dot pattern data; and using the developing agent to print an image represented by the modified dot pattern data and the edge dot pattern data;

wherein said dot reduction routine comprises plural alternative reduction sub-routines, each of said sub-routines providing a different percentage of dot reduction;

further comprising the step of:

selecting one of said sub-routines prior to said step of subjecting the input bit map data to said dot reduction routine.

11. The method according to claim 10, further comprising the step of:

monitoring a progression of use of the developing agent; and outputting a signal controlling said selecting step in accordance with the progression monitored in said monitoring step.

* * * * *